(12) United States Patent
Guski et al.

(10) Patent No.: US 6,993,653 B1
(45) Date of Patent: Jan. 31, 2006

(54) IDENTITY VECTORING VIA CHAINED MAPPING RECORDS

(75) Inventors: Richard H. Guski, Red Hook, NY (US); Walter B. Farrell, Woodstock, NY (US); James W. Sweeny, Millbrook, NY (US); Thomas J. Szczygielski, Endicott, NY (US); John M. Thompson, West Sand Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,882

(22) Filed: Feb. 22, 2000

(51) Int. Cl.
*H04L 9/32* (2006.01)
(52) U.S. Cl. ...................... 713/157; 713/178
(58) Field of Classification Search ................ 707/10, 707/200; 713/155–157, 178
See application file for complete search history.

(56) References Cited

U.S. PATENT DOCUMENTS

| 5,491,817 | A | * | 2/1996 | Gopal et al. ................ 707/200 |
| 5,678,045 | A | * | 10/1997 | Bettels ........................ 707/200 |
| 5,745,574 | A | * | 4/1998 | Muftic ........................ 713/157 |
| 5,761,669 | A | | 6/1998 | Montague et al. .......... 707/103 |
| 5,774,552 | A | * | 6/1998 | Grimmer .................... 713/156 |
| 5,896,440 | A | * | 4/1999 | Reed et al. ................. 379/9.03 |
| 5,922,074 | A | | 7/1999 | Richard et al. ............. 713/200 |
| 6,013,107 | A | | 1/2000 | Blackshear et al. ......... 703/229 |
| 6,081,814 | A | * | 6/2000 | Mangat et al. ........... 715/501.1 |
| 6,192,362 | B1 | * | 2/2001 | Schneck et al. ............... 707/10 |
| 6,233,577 | B1 | * | 5/2001 | Ramasubramani et al. .... 707/9 |
| 6,292,838 | B1 | * | 9/2001 | Nelson ........................ 709/236 |
| 6,615,347 | B1 | * | 9/2003 | de Silva et al. ............ 713/156 |
| 2002/0062438 | A1 | * | 5/2002 | Asay et al. ................. 713/157 |

FOREIGN PATENT DOCUMENTS

EP    0 862 105 A2    2/1998

OTHER PUBLICATIONS

Wahl, RFC 2256, "A Summary of the X.500(96) User Schema for use with LDAPv3".*
IBM Technical Disclosure Bulletin, vol. 31, No. 4, Sep. 1988—Method to Provide User ID/Group ID Translation in the IBM RT/PC Networks, pp. 306-307.
IBM Technical Disclosure Bulletin, vol. 32, No. 9A, Feb. 1990—Sessions-Based Secure Communication For Secure Zeniz, pp. 239-243.
IBM Technical Disclosure Bulletin, vol. 34, No. 10B, Mar. 1992—Mechanism for Supporting Multiple Authentication Servers, pp. 200-201.
IBM Technical Disclosure Bulletin, vol. 18, No. 8, Aug. 1995—Mapping of Distributed Computing Environment Identities to MVS Userids, pp. 213-214.

(Continued)

*Primary Examiner*—Andrew Caldwell
*Assistant Examiner*—Matthew Heneghan
(74) *Attorney, Agent, or Firm*—William A. Kinnaman, Jr.; Cantor Colburn LLP

(57) ABSTRACT

An identity vectoring method is accomplished by matching a distinguished name or partial distinguished name from a digital certificate with a distinguished name mapping record. A data field in the distinguished name mapping record includes either a variable name or a user ID. The variable name corresponds to any environmental factor. The next mapping record to be considered, the criteria mapping record, is determined by substituting the environmental factor for the variable name in the data field. A data field in the criteria mapping record includes either a variable name or a user ID. The process completes when a mapping record containing only a user ID is encountered or when no matching criteria mapping records are found.

24 Claims, 4 Drawing Sheets

OTHER PUBLICATIONS

IBM Technical Disclosure Bulletin, vol. 38, No. 09, Sep. 1995—Partial Containment Structure for Integration of Distributed Computing Environment and Local Registries, pp. 535-538.

U.S. Appl. No. 09/332,704, filed Jun. 14, 1999, Frey et al., Abandoned Sep. 12, 2002—Mapping of Name Space Object Identitiesto Distinguished Names.

* cited by examiner

IDENTITY VECTORING VIA CHAINED MAPPING RECORDS

FIELD OF THE INVENTION

The present invention generally relates to user authentication and authorization on a computer network, more specifically, to network authentication and authorization using identity vectoring via chained mapping records.

BACKGROUND OF THE INVENTION

Network operating systems often include access control systems (security systems) for controlling access to entities that are stored on the network or coupled to the network. The term "entity" includes hardware such as gateways to other networks, printers, and modems, as well as software such as directories, files, application programs, data, records, fields in a record, and cells in a spreadsheet—in other words, virtually any hardware or software resource of a computer network. Regardless of whether the network is simply two computers coupled peer-to-peer, or a wide area network with thousands of users, the access control system for the network will typically require authentication and authorization of the network's users. That is, the system will identify each user that can connect to the network (authentication) and limit the user's access rights to those entities on the network (authorization).

In large networks, a user may need to access a number of different access control systems, either explicitly, through manually logging onto the systems, or implicitly, where an application running on a client workstation interacts with a number of server applications. For example, a user may need to access the functions of an office network from the Internet using a Secured Sockets Layer (SSL) protocol. In such networks, public key cryptographic systems have been widely used to authenticate the user.

Public key cryptographic systems are well known. In public key cryptographic systems, a trusted authority may create a digital message, which contains a user=s public key and the name of the user. A representative of the trusted authority (Certificate Authority) digitally signs the digital message with the authority=s own signature to verify that the public key does indeed belong to the named user. A standard way of encoding such digital messages, known as digital certificates, is described in the X.509 V3 standard. In an X.509 digital certificate, the user's "name" is the user's distinguished name within the X.500 architecture. The X.500 architecture describes a tree-like naming scheme, wherein each entity on the network has a unique, or distinguished, name.

Access control systems for some Internet-based networks employ the user's X.500 distinguished name from the X.509 digital certificate to both authenticate and authorize the user. In such systems, the X.500 distinguished name is mapped (correlated) to user's credentials using a mapping record within a security registry. The mapping record contains a user namespace identification (user ID) or similar logon information corresponding to a single distinguished name. A number of these mapping records are stored in a security registry, which contains at least one mapping record for each digital certificate that the access control system is to recognize. If the X.500 distinguished name is recognized (i.e. contained in one of the mapping records), the ID corresponding to that distinguished name will be used to establish a network access environment wherein the user is provided access authorized entities on the network. One example of such an access control system is described in U.S. Pat. No. 5,922,074, issued on Jul. 13, 1999, and entitled "Method and Apparatus for Providing Secure Distributed Directory Services and Public Key Infrastructure."

The use of mapping records eliminates the need for the user to authenticate with more than one server on the same network. In addition, the user ID provided by the mapping record can be used to authorize the user's access right to entities on the network. However, the use of mapping records and directory databases have several drawbacks. For example, the number of users that can be supported is limited by the number of mapping records that the database can handle. This drawback is exacerbated by the fact that the mapping record points to one, and only one, user ID.

SUMMARY OF THE INVENTION

A method of identity vectoring using chained mapping records includes comparing a distinguished name or partial distinguished name with a plurality of mapping records. A mapping record matching the distinguished name or partial distinguished name is located. A variable from the matching mapping record is then replaced by an environmental factor to create a new search criteria. The new search criteria is then compared with the plurality of mapping records.

With this invention, the environmental factors have the effect of automatically directing, or "vectoring," the mapping process to its final selection and conclusion. This invention adds flexibility to the current implementation of identity mapping by allowing a mapping record to "point to" multiple user IDs with the final selection of the mapping record (to which the digital certificate will be mapped) based on network environmental factors.

BRIEF DESCRIPTION OF THE DRAWINGS

Referring now to the drawings wherein like elements are numbered alike in the several FIGURES.

DETAILED DESCRIPTION OF THE INVENTION

Figure 1:
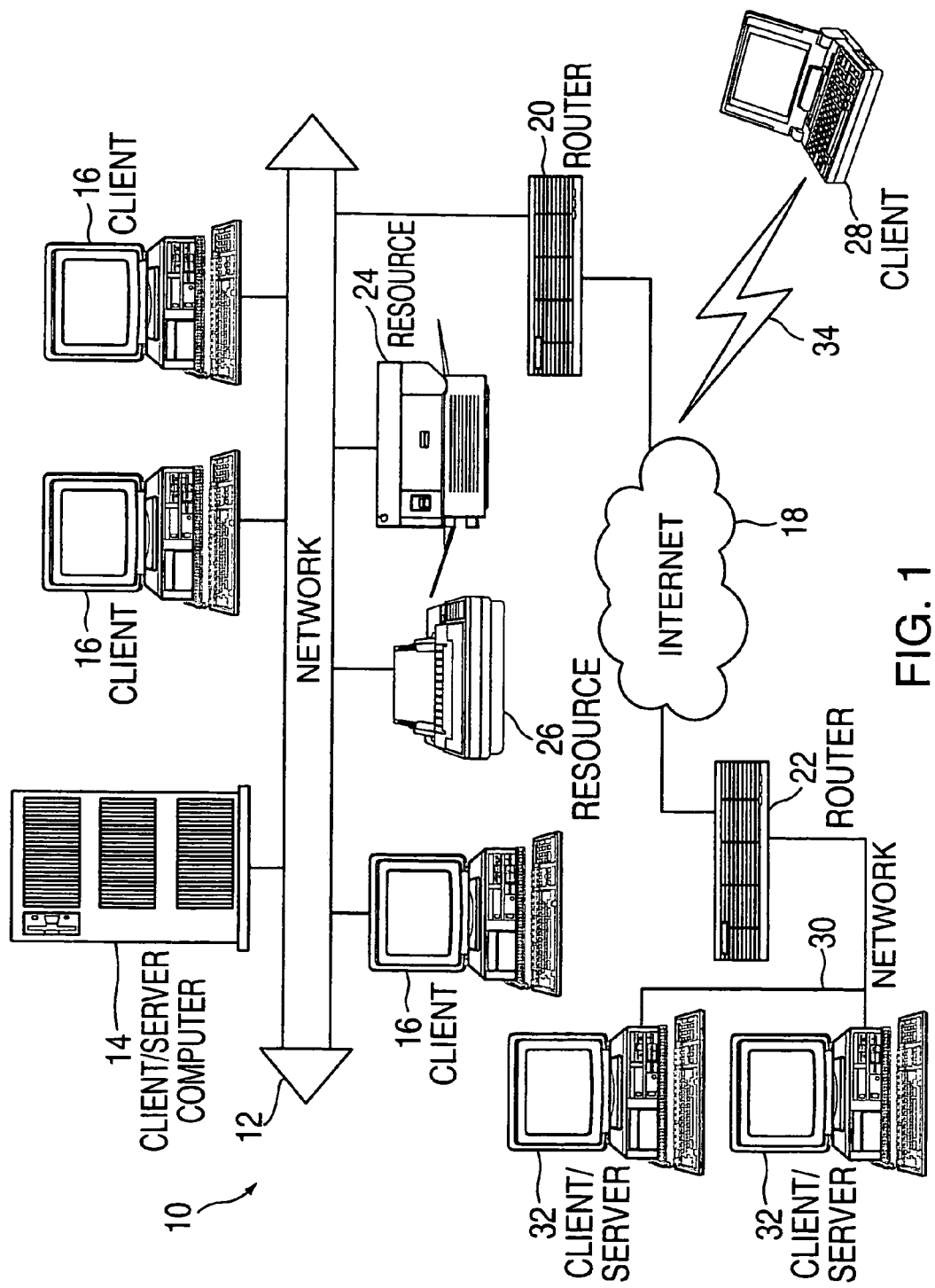
FIG. 1 is a block diagram of the resources, entities, and users coupled on a exemplified computer communications network.

Referring to FIG. 1, an exemplified block diagram network is shown generally as 10. The network 10 employs multiple client/server entities interconnected via local or wide area networks (LAN or WAN) 12, 30 and the Internet 18. The networks 12, 18, 30 shown are intended to be representative of the many network designs such as Ethernet, token ring, etc. These networks employ a variety of protocols such as NETBIOS and TCP/IP.

Network 12 includes PC-type computers 16 to provide a plurality of client processes (clients). Such client processes would include any process that makes requests for network resources (entities). A client may also be hardware or circuitry embodied in, for example, a Smart Card Reader requesting information or services. Computers, such as PC-type computers 16, that provide one or more client processes are hereinafter referred to as client computers. Client computers 16 allow users to connect to network resources such as printers 24 and 26.

A computer system 14 (e.g., a mainframe or minicomputer) provides one or more server processes (servers) to the network, and may also run one or more client processes. Minicomputer 14 may, for example, run IBM Corporation's commercially available OS/390 operating system, and servers operating on minicomputer 14 may include a web server, such as IBM's commercially available Domino Go Web Server™((WebSphere Application Server™), a security server, such as IBM's commercially available O/S390 Security Server™, an E-mail server, a print server or any other process that fulfils requests for information services. Forming part of at least one of these servers, or itself being a server, is an access control system, which provides authentication and authorization functions for clients and servers within an X.500 namespace. One example of such an access control system is Resource Access Control Facility (RACF) ™, which forms part of the O/S390 Security Server™. Computers, such as minicomputer 14, that provide one or more server processes are hereinafter referred to as server computers.

Other networks, such as network 30, communicate with network 12 via the Internet 18 through routers 20 and 22. Network 30 includes workstations 32, which may, for example, be an IBM PC, operating as both a client and a server computer. Remote client computers 28 may communicate with the Internet 18 via phone lines 34 and router 20 to network 12.

Although network 30 is shown connected to network 12 via the Internet 18, any other network connection might be utilized without interference with the present invention. Thus, for example, an intra-office network that distributes digital certificates may be used with the present invention. Finally, the network block diagram 10 is shown by way of illustration and not limitation.

Figure 2:
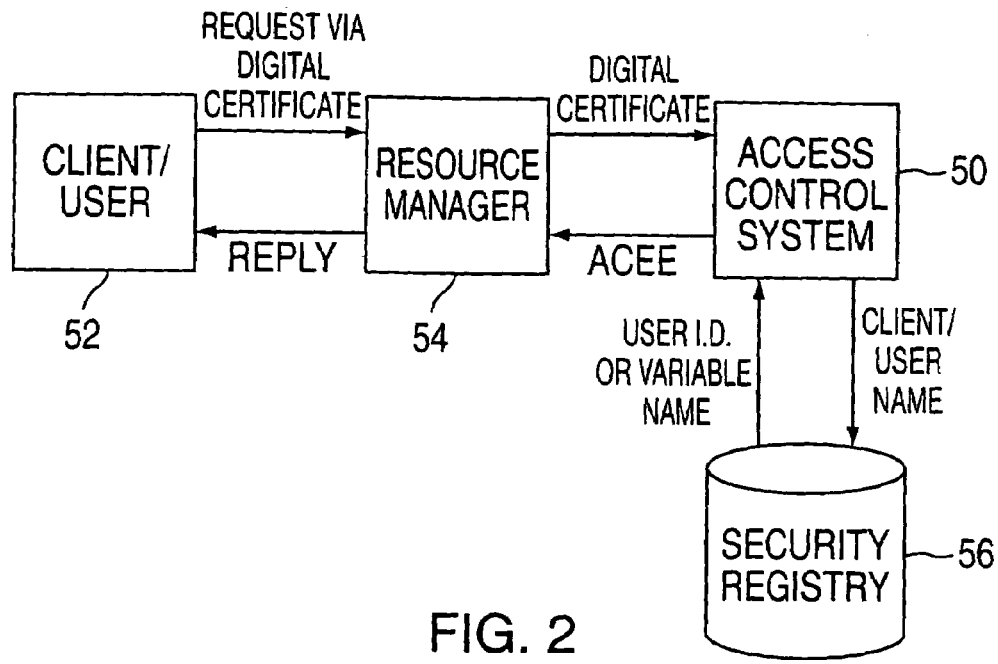
FIG. 2 is a data flow diagram of a client/server relationship including an access control system of the present invention.

FIG. 2 is a data flow diagram showing a client/server relationship including the access control system 50 of the present invention. The client (user) 52 may be, for example, any client process operating on any of the client computers described above in conjunction with FIG. 1. Similarly, the access control system 50 may operate on any of the server computers described above in conjunction with FIG. 1. Located between the client 52 and the access control system 50 is a resource manager 54. Resource manager 54 is, for example, a server, an application, or a print or data manager on the network. Resource manager 54 may include, for example, IBM's commercially available Domino Go Web Server™((WebSphere Application Server™), TSO/E™ time-share server, Lotus Notes for O/S390™, Novell Directory Services for O/S390™, or O/S 390 Distributed Computing Environment (DCE)™ or UNIX features. A security registry 56 stores a plurality of mapping records, which include information regarding individual users and corporate entities. For example, such a security registry is implemented in IBM O/S390 Security Server RACF™ component.

Figure 3:
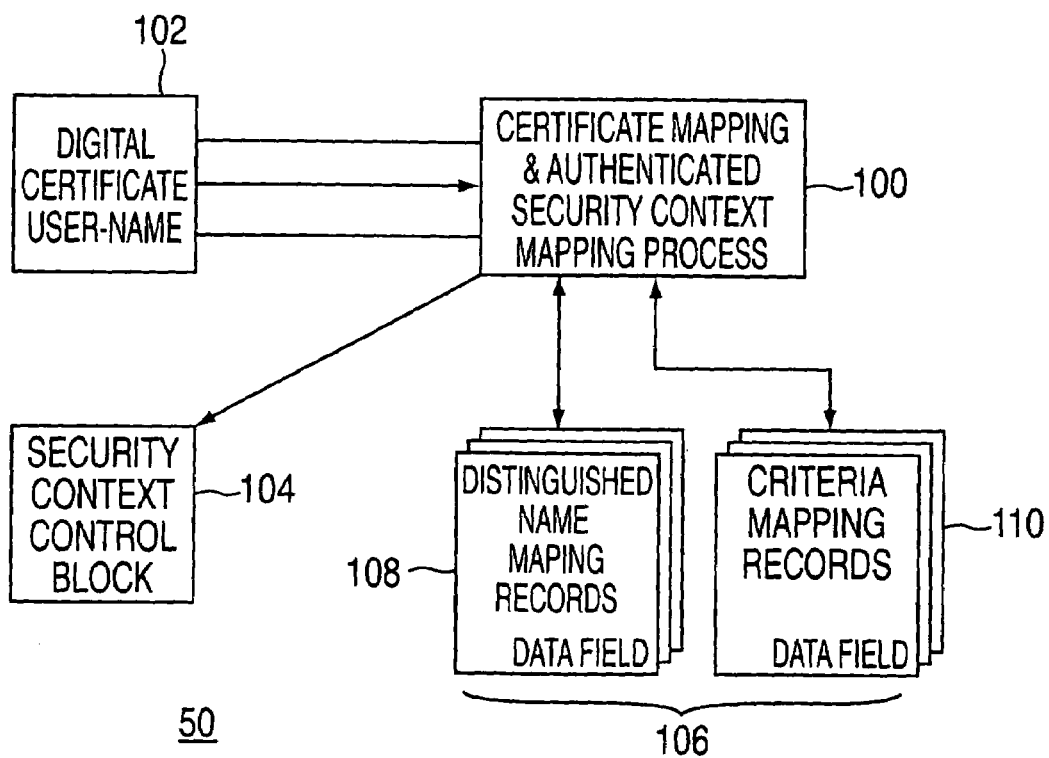
FIG. 3 is a data flow diagram of the access control system of FIG. 2.

FIG. 3 is data flow a diagram of the access control system 50. The access control system 50 includes a certificate mapping and authenticated security context mapping process 100 which receives as input one digital certificate 102 from the resource manager 54 (FIG. 2). Process 100 interacts with one or more of a plurality of mapping records 106 from security registry 56 (FIG. 2). The plurality of mapping records 106 include distinguished name mapping records 108 and criteria mapping records 110. Each distinguished name mapping record 108 corresponds to a distinguished name recognized by the network, and includes a data field including a user ID or variable name, as will be described in further detail hereinafter. The distinguished name mapping record 108 represents a complete distinguished name or some portion of a distinguished name (e.g. X.500 distinguished name). Each criteria mapping record 110 corresponds to an environmental factor used in the chained mapping process, which is described in further detail hereinafter, and a data field including a user ID or variable name. An authenticated security context control block 104 (e.g., IBM's RACF Accessor Control Environmental Element (ACEE)) is generated by process 100 after the user ID corresponding to the digital certificate 102 is determined by process 100. The authenticated security context control block 104 includes the necessary user credentials for establishing an network access environment for the user.

Referring to FIG. 2 and FIG. 3, the operation of the access control system 50 can be shown. Client 52 initiates communication with the resource manager 54. The resource manager 54 responds to the connection and demands that the client 52 identify itself. Client 52 is identified and authenticated over the SSL secured communications protocol using digital certificate 102 (e.g. an X.509 Version 3 digital certificate). The resource manager 54 then provides digital certificate 102 to the access control system 50. Within access control system 50, the certificate mapping and authenticated security context mapping process 100 employs an identity vectoring (selection) method, described hereinafter, to find mapping record(s) 106 within directory database 56 that corresponds to the distinguished name from the digital certificate 102. After the appropriate mapping record(s) 106 is/are found, process 100 creates an authenticated security context control block 104 using the user ID from the mapping record(s) 106. The authenticated security context control block 104 is then passed from the access control system 50 to the resource manager 54. The authenticated security context is then assigned to the individual user's processing thread within the resource manager's process. The resource manager 54 can then use the authenticated security context to authorize the client/user's 52 access to resources on the network.

Figure 4:
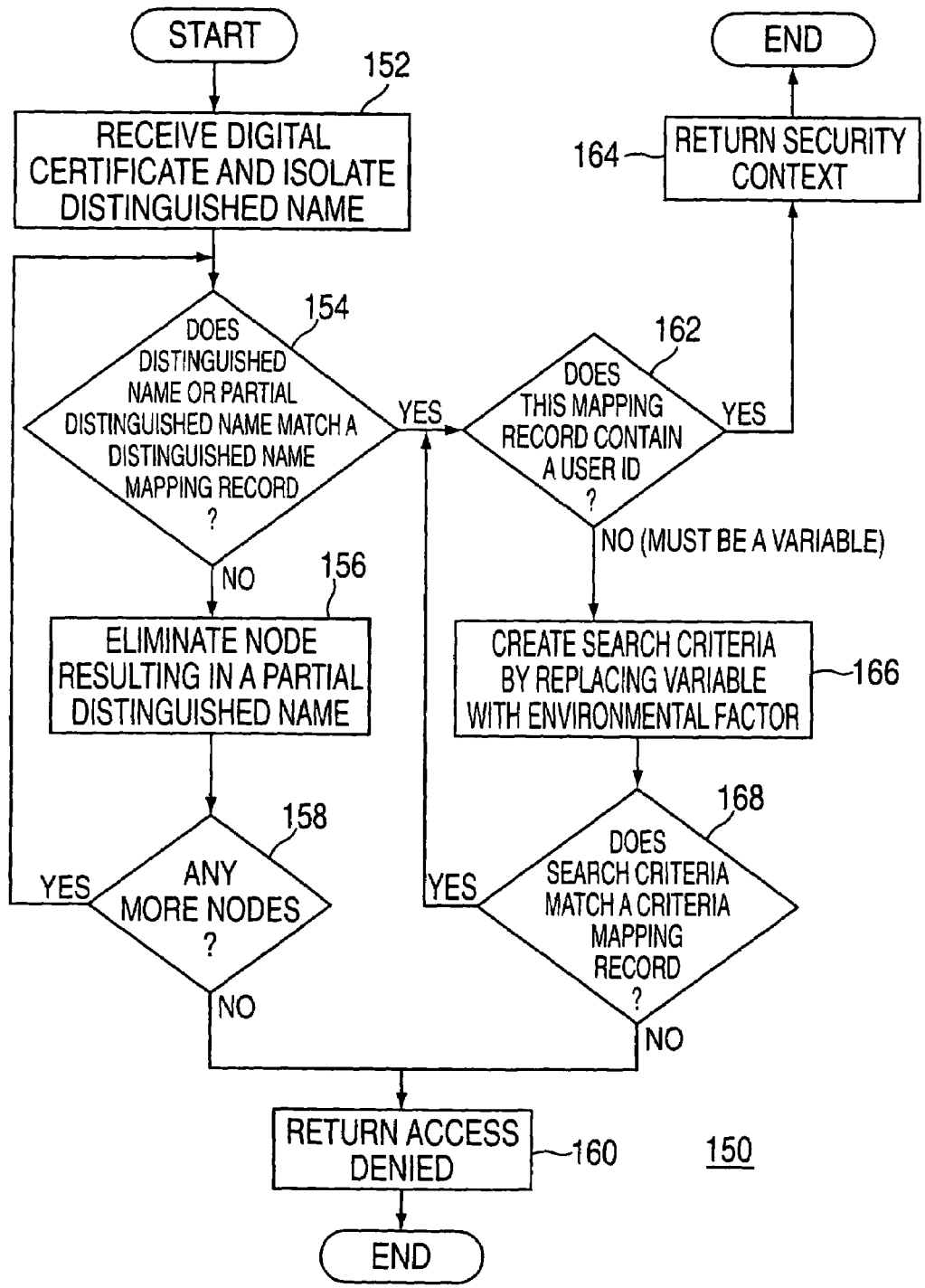
FIG. 4 is a flow chart of the identity vectoring method used in the access control system of FIG. 2.

Operation of the certificate mapping and authenticated security context mapping process 100 will now be shown by reference to FIG. 3 and FIG. 4, where FIG. 4 is a flow chart of the identity vectoring method 150 used within the certificate mapping and authenticated security context mapping process 100 of FIG. 3. Method 150 begins at block 152 where a digital certificate 102 is received by the authenticated security context mapping process 100. Method 150 then proceeds to block 154 where the distinguished name from the digital certificate 102 is compared with distinguished name mapping records 108. If no match is found, method 150 continues to block 156 where a portion (node) of the distinguished name is deleted to create a partial distinguished name (partial path name). If there are any more nodes (i.e., the last node has not been eliminated in block 156) then method 150 continues from block 158 to block 154, where the partial distinguished name is compared with distinguished name mapping records 108. If there are no more nodes (i.e., the last node was eliminated in block 156) then access is denied at block 160 and method 150 ends.

If, in block 154, the distinguished name of partial distinguished name matches one of the distinguished name mapping records 108, method 150 continues at block 162. At block 162, it is determined whether or not the data field for the matching distinguished name mapping record 108 contains a user ID or a variable name. If the data field contains a user ID, an authenticated security context control block 104 is created using the user ID from that distinguished name mapping record 108, and the authenticated security context control block 104 is returned to the resource manager at block 164. Method 150 then ends. However, if the data field does not contain a user ID (i.e., it contains a variable name), then method 150 continues at block 166.

At block 166 the variable name is replaced with an environmental factor associated with the variable name existing at the time the digital certificate was received by process 100 in block 152. Replacing the variable name with the environmental factor creates a new search criteria. Method 150 then continues at block 168 where the search criteria is compared to the criteria mapping records 110. If no criteria mapping record 110 matches the criteria name, access is denied in block 160 and method 150 ends. If a matching criteria mapping record 110 is found, then the data field of the matching criteria mapping record 110 is checked for a user ID (as before) in block 162. Method 150 continues as described until either a user ID is found in block 162 or no more criteria matches occur in block 168.

At any point in the identity vectoring method 150 when a sought mapping record 106 is not found and the user's distinguished name cannot be reduced further, the request processing ends, usually resulting in the failure of the original request, e.g. at sign-on.

It is evident that mapping record 106 data fields could be defined so as to put method 150 into a loop. However, an actual implementation would keep track of all chain traverses and end the process if such a loop occurs.

Figure 5:
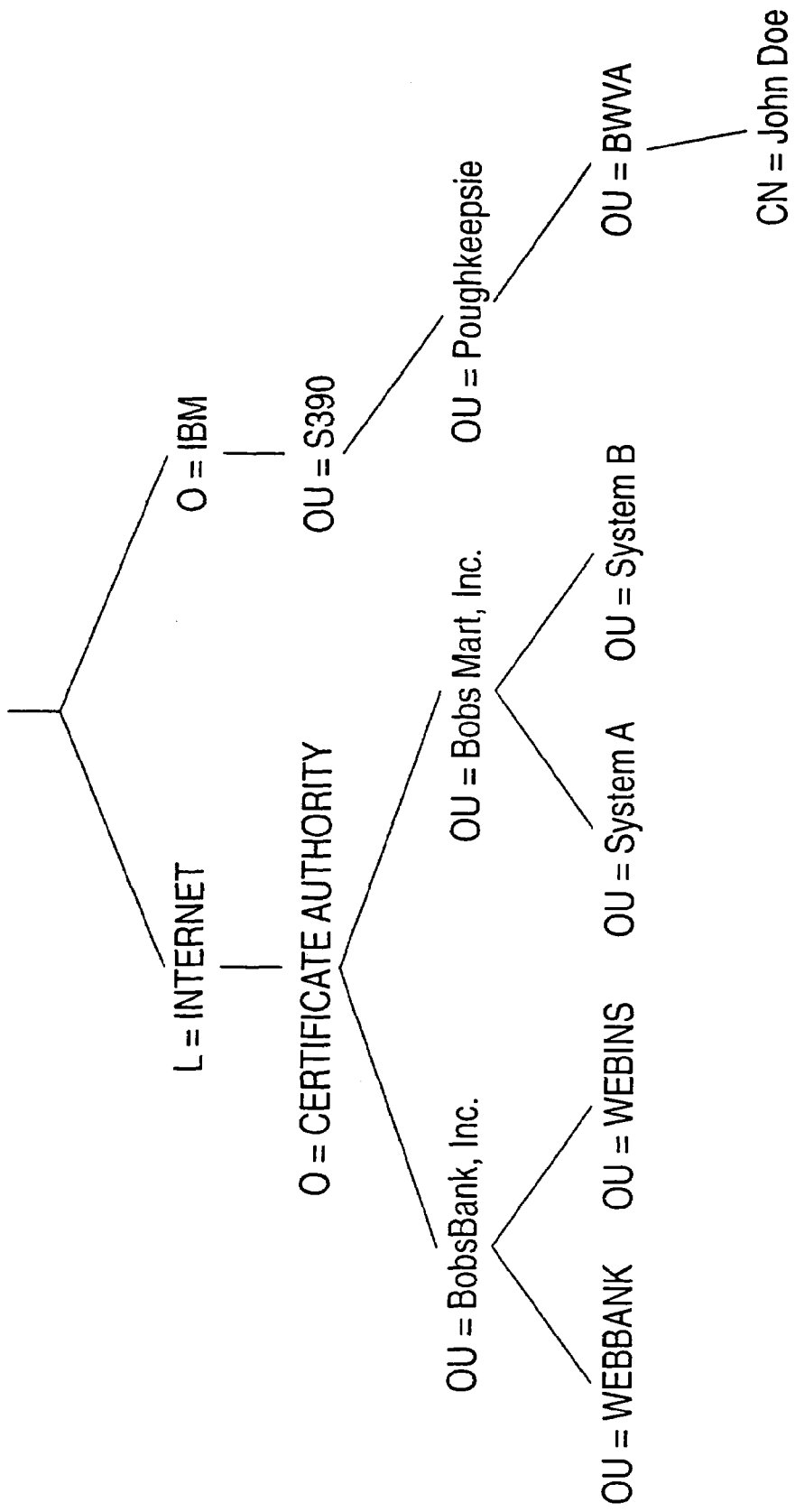
FIG. 5 is a graphical representation of an X.500 directory information tree.

Examples of the operation of identity vectoring method 150 can now be shown by reference to FIG. 3, FIG. 4, and FIG. 5, where FIG. 5 is an X.500 directory information tree. As noted previously, the user's distinguished name from the digital certificate 102 identifies the user's location in the X.500 directory information tree. In block 156 of method 150, an attempt is made to determine the user's ID by comparing the user's distinguished name with distinguished name mapping records 108. For the tree shown in FIG. 3, John Doe's X.500 distinguished name is:

/O=IBM/OU=S390/OU=POK/OU=BWVA/CN=John Doe                                   (1)

Or, written in the address form recognized by IBM's O/S390 Security Server RACF™ component, the distinguished name mapping record 108 matching John Doe's distinguished name would be:

CN=John Doe, OU=BWVA, OU=POK, OU=S390, O=IBM                                 (2)

Where each level of the X.500 tree (i.e. each portion of the distinguished name) represents one node. The interpretation of the nodes in the tree structure of FIG. 1 is that John Doe works in department BWVA in Poughkeepsie for the S390 division of the IBM corporation. A user ID may be assigned for each node level in the X.500 tree, with the ID providing authorization for resources at that node level. Using the above example, assume that node OU=Poughkeepsie is assigned a user ID POKUSR, and node OU=BWVA is assigned user ID BWVAUSR. John's name matches both nodes, so the more specific node, OU=BWVAUSR is used, associating John with user ID BWVAUSR and the access rights to resources associated with that user ID and node level.

At block 154 of method 150, the distinguished name and distinguished name mapping record, shown at (1) and (2) above, would be compared. Distinguished name (1) and distinguished name mapping record (2) are exact matches (i.e. their nodes match one-to-one). Therefore, method 150 would continue from block 154 to block 162. In addition, because distinguished name mapping record (2) is associated with a user ID (BWVAUSR), method 150 would continue to block 164 where an authenticated security context control block 104 is created using the user ID. However, if distinguished name mapping record (2) were associated with a variable and not a user ID, method 150 would continue to block 166.

Returning to block 154, if no matching distinguished name mapping record 108 exists for the distinguished name, method 150 continues to block 156 where one node from the distinguished name would be deleted to create a partial distinguished name. For distinguished name (1), the first partial distinguished name is OU=BWVA, OU=POK, OU=S390, O=IBM, the next partial distinguished name is OU=POK, OU=S390, O=IBM, etc. After the node is deleted, the partial distinguished name is checked for a matching distinguished name mapping record 108 at block 154. Method 150 continues in this manner until all of the nodes have been eliminated or a matching distinguished name mapping record 108 is found. If a matching distinguished name mapping record 108 is found, method 150 continues to block 162.

If, in block 162, the data field for the matching distinguished name mapping record 108 includes a variable name, which may be denoted by a special character added to the data field (e.g., "&"), then method 150 continues at block 166 where the search criteria to be used in the next mapping record search is derived by substituting an environmental factor existing at sign-on time for the variable name string in the data field. The variable name may correspond to one or more environmental factors. Environmental factors, as used herein, include any system and/or application statuses that may be in effect at the time the sign-on occurs. With this invention, these environmental factors have the effect of "vectoring" the mapping records and therefore the user ID selection process to its final selection and conclusion.

The following are two examples of how such identity vectoring could be used. In these examples, the environmental factors are, in the first example, the target application requested by client/user 52, and, in the second example, the strength of encryption used for the SSL connection between client/user 52 and resource manager 54 (i.e., between client and server). It will be recognized, however, that the identity vectoring method described herein is not limited to these two environmental factors, but could include other environmental factors as well.

In the first example, mapping records 106 have been defined that will direct the certificate mapping process 100 to map one digital certificate 102 to two user IDs. The mapping records 106 include additional information that says, in effect, "map to the first user ID when the application the user is signing onto is the first application, else map to the second user ID". In this example, BobsBank, Inc. has two web based applications, an online banking application, and an online insurance application. It has contracted a certificate authority (e.g. VeriSign) to issue certificates to its user base. Each user will be issued only one certificate. When one of the company's users connects to the banking application using the certificate authority issued certificate, the user ID assigned should be BANKU. If the user connects to the insurance application using that same certificate, the user ID assigned should INSUREU. Thus, with reference to the X.500 tree of FIG. 5, the distinguished name mapping record 108 would be:

mapping record:

OU=Bob'sBank,Inc. General Subscriber.O=Certificate Authority L=Internet data field:

/APPLID=&APPLID

The "/" indicates to the certificate mapping process 100 that this is a variable name rather than a user ID. When digital certificate 102 is presented to certificate mapping process 100, and this variable name is found (blocks 154 and 162), certificate mapping process 100 substitutes the appropriate environmental parameter for &APPLID (block 166). In this case, the environmental parameter is the application ID, which is provided to certificate mapping process 100 by the resource manager 54. If the application being accessed is WEBBANK, then the substitution results in APPLID=WEBBANK. Next, mapping process 100 looks for a criteria mapping record 110 that matches the name APPLID=WEBBANK (block 168). This search would yield the user ID BANKU. Alternatively, if the application being accessed is WEBINS, then the substitution (block 166) results in APPLID=WEBINS, and process 100 looks for a criteria mapping record 110 to match the name APPLID=WEBINS (block 168). This search would yield the user ID INSUREU. In addition, if the certificate 102 could also be used for other applications besides the banking and insurance applications, and should be associated with a user ID, a generic criteria mapping record 110 would correspond to a search criteria APPLID=*, where "*" is a generic (wild card) value, could be created to cover all other applications.

In the second example, the environmental factor is the strength of encryption used for the SSL connection of client to server. The SSL protocol supports negotiating the encryption strength, allowing a connection to be either high strength, using at least 128 bits, or low strength, using 40 bits for encryption. In this example, BobsMart has contracted with a certificate authority to provide certificate to its account representatives, who access the company's system through SSL. Account representatives connect either through system A (System A in FIG. 5) or through system B (SystemB in FIG. 5), depending on the strength of the encryption. System A includes general information, and can be accessed using a low strength encryption level, while system B includes sensitive information about the company's customers and should only be accessed using a high strength encryption level. Advantageously, the identity vectoring method 150 allows system A and system B to share the same distinguished name mapping record 108. Account representatives have resource access based on the user ID ACCTREP when using high strength encryption, and the user ID GENERAL when using low strength encryption. The resource manager 54 used to access system data has a variable that specifies the encryption level as either HIGH or LOW, based on the encryption strength negotiated by the SSL connection. This variable is passed when the resource manager 54 calls process 100 to identify and authenticate the user. The distinguished name mapping record 108 for the digital certificates of account representatives is:

mapping record: OU=BobsMart,Inc.General Subscriber, O=CertificateAuthority, Inc.L=Internet data field:/ENCRLVL=ENCRLVL When a certificate is presented to process 100, the distinguished name mapping record 108 is found based on the user's distinguished name from the digital certificate 102 (block 154), and /ENCRLVL=&ENCRLVL is found in the data field. The "/" that begins this field indicates to process 100 that this is a variable name rather than the user ID (block 162). The encryption level, ENCRLVL, cannot be a predefined value, as it may change independently of the type of user. This value must be passed to process 100 by the resource manager 54. For this example, the resource manager 54 has passed ENCRLVL with a value of LOW. Then, process 100 looks for a criteria mapping record 110 to match the name ENCRLVL=LOW (block 168), which yields the user ID GENERAL. The user ID GENERAL is then used to create an authenticated security context control block 104, which is returned to the resource manager 54 (block 164).

The identity vectoring method 150 described herein enhances the flexibility of user ID mapping by allowing a mapping record to "point to" multiple user IDs, with the final selection of the ID (to which the digital certificate will be mapped) based on network environmental factors that exist at the time of sign-on. Environmental factors can include any system and/or application statuses that may be in effect at the time the sign-on occurs. Because the mapping records may now point to multiple user IDs, the number of users that can be supported by a directory database is increased. Importantly, the identity vectoring method 150 allows an access control system to be dynamically programmed. That is, the resource manager can define the operation of the access control system by implementing variable names to instruct the access control system. Moreover, the security administrator can use the variable names defined by the resource manager to program operation of the access control system.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for authorizing a user on a computer network using chained mapping records, the method including:

receiving a digital certificate for a user requesting access to said computer network;

comparing a distinguished name or a partial distinguished name corresponding to the digital certificate with a plurality of mapping records;

replacing a variable from a first matching mapping record with an environmental factor to create a first search criteria, the first matching mapping record indicating the distinguished name or the partial distinguished name, wherein the environmental factor includes one or more system or application statuses in effect at the time the user signs-on the computer network, operable for enabling the first matching mapping record to point to multiple user identifications;

comparing the first search criteria with the plurality of mapping records; and generating an authorization indicator responsive to at least one of comparing the distinguished name or a partial distinguished name and comparing the first search criteria with the plurality of mapping records.

2. The method of claim 1, wherein the generating an authorization indicator includes generating a security context control block using a user identification from a second matching mapping record, the second matching mapping record indicating the first search criteria.

3. The method of claim 1, further including:
replacing a variable from a second matching mapping record with the environmental factor to create a second search criteria, the second matching mapping record indicating the first search criteria.

4. The method of claim 3, wherein the generating an authorization indicator includes generating a security context control block using a user identification from a third matching mapping record, the third matching mapping record indicating the second search criteria.

5. The method of claim 1, further including:
eliminating a portion of an X.500 distinguished name to create the partial distinguished name used in said comparing the partial distinguished name with the plurality of mapping records.

6. The method of claim 1, wherein the generating an authorization indicator includes generating a security context control block using a user identification from the first matching mapping record if the first matching mapping record includes the user identification.

7. The method of claim 1, wherein comparing the distinguished name or the partial distinguished name corresponding to the user with a plurality of mapping records includes comparing an X.500 distinguished name of the user with the plurality of mapping records.

8. The method of claim 1, wherein the environmental factor includes a system status existing at the time the user signs-on the computer network and replacing a variable includes replacing the variable from the first matching mapping record with said system status.

9. A system for authorizing a user on a computer network using chained mapping records, the system including:
a digital certificate means for receiving a distinguished name over said computer network, said distinguished name corresponding to the user;
a distinguished name mapping record within a directory database, said distinguished name mapping record indicative of at least a portion of said distinguished name, said distinguished name mapping record including a first data field, said first data field including a first variable indicative of a first environmental factor, wherein the first environmental factor includes one or more system or application statuses in effect at the time said digital certificate is received the user signs-on the computer network, operable for enabling said first matching mapping record to point to multiple user identities;

a first criteria mapping record corresponding to a first state of said first environmental factor, said first criteria mapping record including a second data field, said second data field including a first user identity; and a mapping process configured to receive said digital certificate, wherein said mapping process generates a security context control block using said first user identity in response to said first state of said first environmental factor, wherein said digital certificate means is on a computer readable medium.

10. The system of claim 9, further including:
a second criteria mapping record corresponding to a second state of said first environmental factor, said second criteria mapping record including a third data field, said third data field including a second user identity; and
wherein said mapping process is further configured to generate a security context control block using said second user identity in response to said second state of said first environmental factor.

11. The system of claim 9, further including:
a second criteria mapping record corresponding to a second state of said first environmental factor, said second criteria mapping record including a third data field, said third data field including a second variable indicative of a second environmental factor;
a third criteria mapping record corresponding to said second environmental factor, said third criteria mapping record including a fourth data field, said fourth data field including a second user identity; and
wherein said mapping process is further configured to generate a security context control block using said second user identity in response to said second state of said first environmental factor and said third environmental factor.

12. The system of claim 9, wherein said distinguished name is an X.500 distinguished name.

13. The system of claim 10, wherein said first user identity represents a first level of network authorization, and said second user identity represents a second level of network authorization.

14. The system of claim 9, wherein said first environmental factor is a network status at the time said digital certificate is received by said mapping process.

15. The system of claim 9, wherein said first environmental factor is an application status at the time said digital certificate is received by said mapping process.

16. The system of claim 9, wherein said first environmental factor is included in said digital certificate.

17. A storage medium encoded with machine-readable computer program code for authorizing a user on a computer network using chained mapping records, the storage medium including instructions for causing a computer to implement a method comprising:
comparing a distinguished name or a partial distinguished name corresponding to the user with a plurality of mapping records;

replacing a variable from a first matching mapping record with an environmental factor to create a first search criteria, the first matching mapping record indicating the distinguished name or the partial distinguished name, wherein the environmental factor includes one or more system or application statuses in effect at the time the user signs-on on the computer network, operable for enabling the first matching mapping record to point to multiple user identifications;

comparing the first search criteria with the plurality of mapping records; and generating an authorization indicator responsive to at least one of comparing the distinguished name or a partial distinguished name and comparing the first search criteria with the plurality of mapping records.

18. The storage medium of claim 17, wherein the generating an authorization indicator includes generating a security context control block using a user identification from a second matching mapping record, the second matching mapping record indicating the first search criteria.

19. The storage medium of claim 17, further comprising instructions for causing a computer to implement:

replacing a variable from a second matching mapping record with the environmental factor to create a second search criteria, the second matching mapping record indicating the first search criteria.

20. The storage medium of claim 19, wherein the generating an authorization indicator includes generating a security context control block using a user identification from a third matching mapping record, the third matching mapping record indicating the second search criteria.

21. The storage medium of claim 17 further comprising instructions for causing a computer to implement:

eliminating a portion of an X.500 distinguished name to create the partial distinguished name used in said comparing the partial distinguished name with the plurality of mapping records.

22. The storage medium of claim 17, wherein the generating an authorization indicator includes generating a security context control block using a user identification from the first matching mapping record if the first matching mapping record includes the user identification.

23. The storage medium of claim 17, wherein comparing the distinguished name or the partial distinguished name corresponding to the user with a plurality of mapping records includes comparing an X.500 distinguished name of the user with the plurality of mapping records.

24. The storage medium of claim 17, wherein the environmental factor includes a system status existing at the time the user signs-on the computer network and replacing a variable includes replacing the variable from the first matching mapping record with said system status.

* * * * *